UNITED STATES PATENT OFFICE.

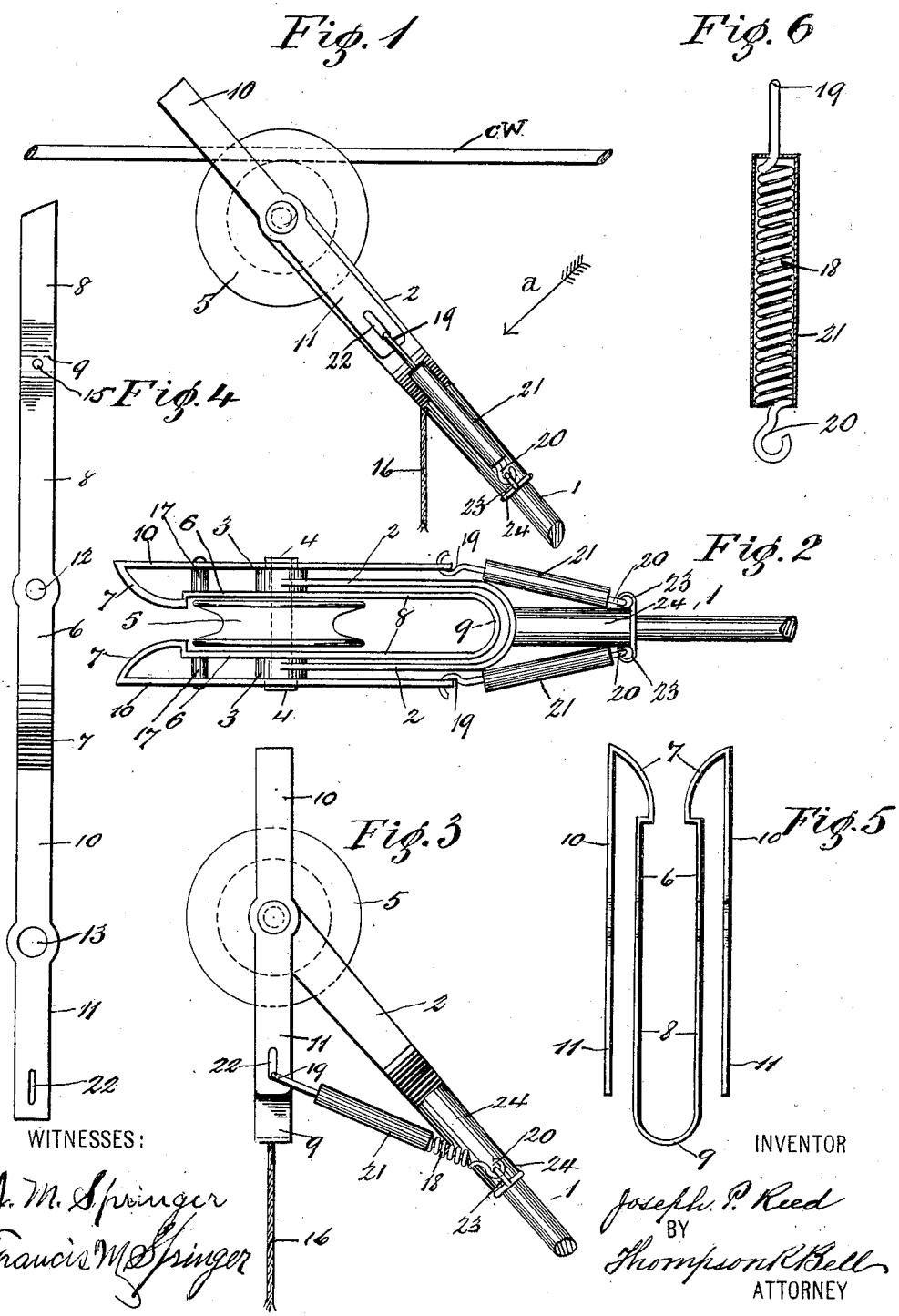

JOSEPH P. REED, OF MUNCIE, INDIANA.

TROLLEY-FINDER.

No. 897,402.  Specification of Letters Patent.  Patented Sept. 1, 1908.

Application filed May 4, 1908. Serial No. 430,811.

*To all whom it may concern:*

Be it known that I, JOSEPH P. REED, citizen of the United States, residing at Muncie, in the county of Delaware and State of Indiana, have invented certain new and useful Improvements in Trolley-Finders, of which the following is a specification, reference being had therein to the accompanying drawing.

This invention relates to improvements in the construction of trolley conducting wire finders for electrically propelled cars by means of which the trolleys are expeditiously guided into position to contact with the overhead trolley conducting wire, in such cases, as when the trolley jumps out of contact with said trolley conducting wire.

The object of this invention is to construct a trolley conducting wire finder of a bifurcated form that may be cheaply manufactured and easily applied to any trolley pole fork; also, to construct a trolley conducting wire finder in such form that the finding arms or bifurcations thereof are capable of being moved into vertical position, so that the free outwardly flared ends of the arms or bifurcations thereof will be readily caused to engage the trolley conducting wire to direct the trolley into such position so as to contact said wire, also, to provide outer bearing reinforcing arms having their top ends connected to the top ends of the flaring portions of said finder arms or bifurcations, whereby the latter are reinforced and prevented from being sprung or distorted, and to provide means for yieldingly retaining said finder arms or bifurcations of said trolley conducting wire finder in their normal position, whereby said trolley conducting wire finder may be operated with equal facility whether the trolley is situated in position relatively to the car corresponding to either a forward or rearward motion of the latter. I attain these objects by means of the trolley conducting wire finder illustrated in the accompanying drawings in which like numerals of reference designate like parts throughout the several views.

Figure 1 is a side elevational view of the forked end of a trolley pole showing the trolley thereof contacting the conducting wire, and the trolley finder applied thereto having its finder arms situated in their normal position; Fig. 2 is a top view of the same looking in the direction of the arrow *a* in Fig. 1; Fig. 3 is a side elevational view similar to that of Fig. 1, showing the upper trolley finder arms moved into vertical position to guide the trolley to and in contact with the trolley conducting wire; Fig. 4 is a developed broken view of a half portion of the trolley finder which shows the same formed in one integral piece and cut from a single piece of metal; Fig. 5 is a detail view of said trolley finder showing the piece represented in Fig. 4 bent into form; and, Fig. 6 is a detail view of one of the retaining springs of the trolley conducting wire finder in which the spring shield is shown in section to more clearly exhibit the construction of said spring.

The trolley, trolley pole, and fork may be of the usual or any suitable form of construction, as the trolley pole 1 on the top end of which is secured the trolley carrying fork 2, and on the free ends of the bifurcations of said fork 2 are formed the bosses 3 which are drilled to receive the bearing bolt 4 upon which the trolley 5 is journaled.

The trolley finder is composed of the upper arms 6 having the outwardly flaring top portions 7, the lower arms 8 which are connected at their lower ends by the bend 9, and the outer reinforcing arms 10 extending from the top end portions of the outwardly flared portions 7, and provided with the downwardly extending portions 11, all of which portions are preferably formed of one integral piece cut from a sheet of metal into the form illustrated in Fig. 4, in which 6 denoted the upper arm, 12 the pivotal bores of said arms, 8 the lower arms having the central portion 9, 10 the outer reinforcing arms having the pivotal bores 13 and the lower downwardly extending arms 11 at the bottom ends of which is formed the spring connecting slots 22. The metal thus formed is first bent at its center portion to form the bend 9 and till the arms 6 and 8 are situated directly opposite and parallel to each other, so that the pivotal bores 12 of said arms are in alinement. I then bend the top portions of the arms 6 to form the outwardly flaring portions 7, and finally bend the reinforcing arms 10 at their lines of juncture with the top ends of the flaring portions 7 till said arms are directed downwardly and situated exteriorly of said top arms 6 and parallel therewith and in such a manner that the pivotal bores 13 thereof will be in alinement with the bores 12.

The central portion of the bend 9 is provided with a bore 15 through which the end of the pull down rope 16 is passed and secured.

The pull-down rope 16 is provided for the purpose of moving the trolley finder from its normal position as shown in Fig. 1 to the vertical position as shown in Fig. 3 to engage the trolley conducting wire *c w* to guide the trolley 5 to and into contact with said conducting wire.

The distance pieces 17 are secured between the inner and outer arms 6 and 10 at their top ends, and the same is provided for the purpose of stiffening the arms of the trolley conducting wire finder at these points and preventing said arms from being sprung out of their parallel relation with each other.

The coil springs 18 are provided with the top hooked ends 19 and the bottom hooked ends 20. The shields 21 are closed at their top ends and fit loosely over the coil springs 18, and the same are provided for the purpose of forming a shield or dust cover to prevent dust or dirt accumulating on said springs. The top hooked ends 19 of said springs are adapted to be hooked into the slots 22 formed in the ends of the prolonged outer arms 11 and the bottom hooked ends 20 of said springs are adapted to hook the eyes 23 formed on the bottom end of the tubular stem 24 of the trolley pole fork 2.

I claim:—

1. In a trolley for electrically propelled cars, the combination with a trolley pole having an upper forked end, a trolley bearing bolt projecting through said forked end and a trolley journaled on said bolt and situated between the bifurcations of said fork, of a bifurcated trolley wire finder having its arms pivoted on said bolt, a bend connecting the lower ends of said arms, outer arms extending from the top ends of said finder arms and pivoted on the prolonged outer ends of said bolt, and yielding springs connected to the lower ends of said outer arms whereby the trolley finder is yieldingly maintained in normal position.

2. In a trolley for electrically propelled cars, the combination with a trolley pole having an upper forked end, a journal bolt projecting through said forked end and a trolley journaled on said bolt and situated between the bifurcations of said forked end of said trolley pole, of a bifurcated trolley finder composed of a single piece of metal forming two inner parallel arms or bifurcations and two outer parallel reinforcing arms, each of which arms has a hole at its central portion to pivotally receive said journal bolt, the inner arms of which are arranged to be situated on each side of said trolley and between the bifurcations of the fork of said trolley pole, and said outer arms extending exteriorly of the latter.

3. In a trolley for electrically propelled cars the combination with a trolley pole having an upper forked end, a journal bolt projecting through said forked end, and a trolley journaled on said bolt and situated between the bifurcations of said forked end of said trolley pole, of a bifurcated trolley finder constructed of a single piece of metal forming inner upper arms and lower parallel arms, a bend connecting the lower ends of said parallel arms, outer arms extending downwardly from the upper free ends of said upper arms and situated parallel with the latter, said inner and outer arms pivotally mounted at or near their central portions on said journal bolt, and a pull-down rope connected to said connecting bend of said lower inner arms.

4. In a trolley for electrically propelled cars, the combination with a trolley pole having an upper forked end, a journal bolt passing through said forked end and a trolley journaled on said journal bolt and situated between the bifurcations of said forked end of said trolley pole, of a bifurcated trolley finder constructed of a single piece of metal forming upper inner finder arms and lower parallel arms, the upper end portions of said upper inner arms being flared outwardly, downwardly extending arms connected at their top ends to the top ends of the flaring portions of said inner upper arms, said inner and outer arms being pivoted on said journal bolt, said outer arms having lower prolonged ends, a pull down rope secured to the bend of said lower inner arms and yielding means connected to the lower prolonged ends of said outer arms.

In testimony whereof I affix my signature in presence of two witnesses.

JOSEPH P. REED.

Witnesses:
M. GILBERT,
C. C. PAVEY.